United States Patent [19]

Knowles

[11] Patent Number: 4,598,600
[45] Date of Patent: Jul. 8, 1986

[54] BEARING SUPPORT STRUCTURE
[75] Inventor: William C. Knowles, Glastonbury, Conn.
[73] Assignee: United Technologies Corporation, Hartford, Conn.
[21] Appl. No.: 558,400
[22] Filed: Dec. 5, 1983
[51] Int. Cl.$^4$ ............................ F16H 1/14; F02C 7/20
[52] U.S. Cl. ........................................ 74/423; 74/15.8; 60/39.31
[58] Field of Search ................. 74/423, 15.8; 60/39.31
[56]         References Cited
         U.S. PATENT DOCUMENTS

| | | | |
|---|---|---|---|
| 3,163,353 | 12/1964 | Petrie | 60/39.31 |
| 3,269,118 | 8/1966 | Benedict | 60/39.31 |
| 3,491,536 | 1/1970 | Hadaway | 60/39.31 |
| 3,505,813 | 4/1970 | McCarthy | 60/39.31 |
| 3,896,757 | 7/1975 | Kucher | 74/423 |
| 4,135,411 | 1/1979 | Alessio | 74/423 |

*Primary Examiner*—Henry C. Yuen
*Attorney, Agent, or Firm*—Charles A. Warren

[57]              ABSTRACT

The intermediate case for turbo fan engines has a bearing support cone extending forwardly from the support flange in alignment with the struts in the case to provide a secure support for the #2 bearing for the low pressure shaft. To accommodate the power shaft assembly which extends through the cone the latter has a bulge in which is mounted the support cylinder for the bearings for the power shaft, this bulge providing a support structure for the cylinder and clearance for a bevel gear on the power shaft journaled in the cylinder.

8 Claims, 3 Drawing Figures

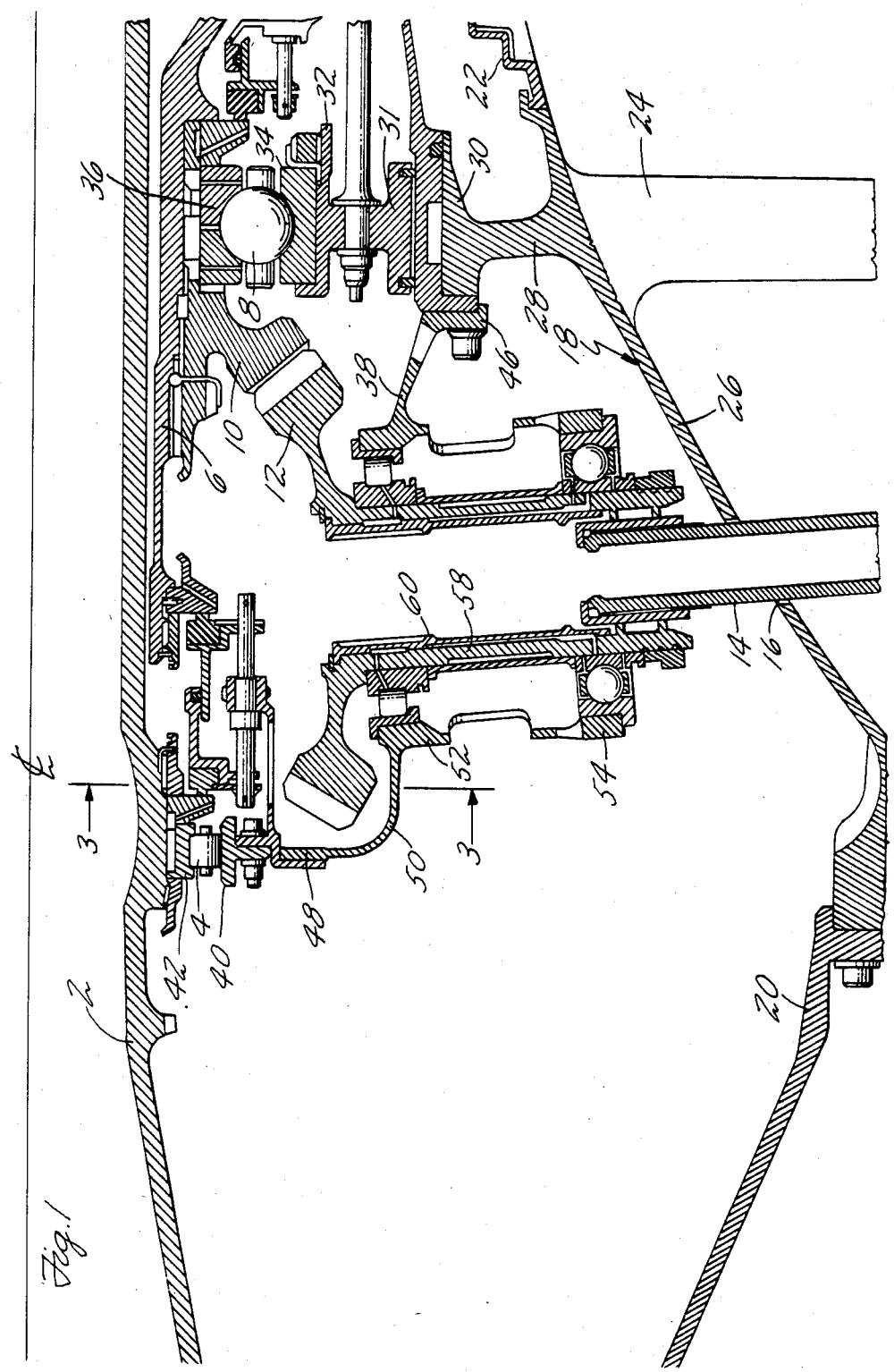

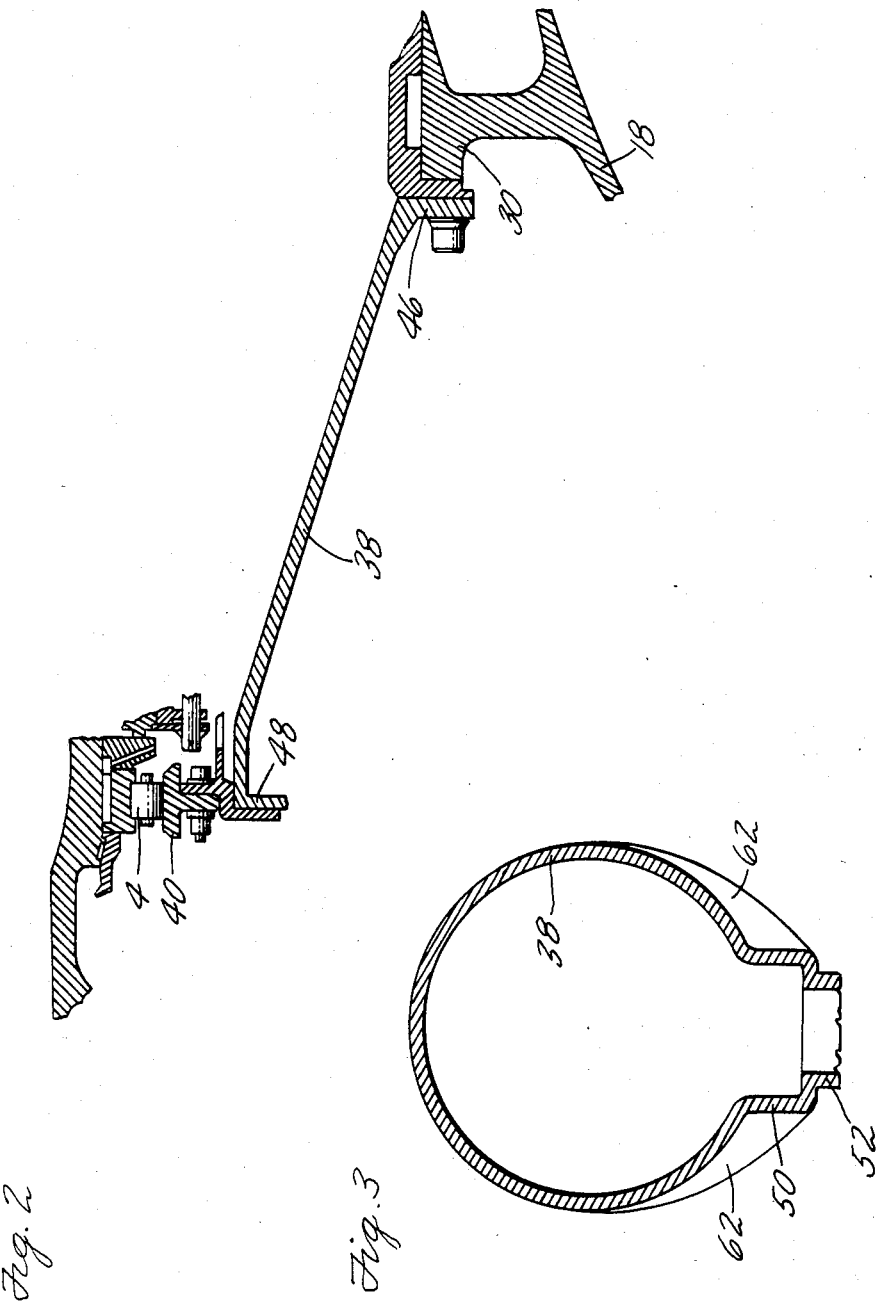

BEARING SUPPORT STRUCTURE

TECHNICAL FIELD

In gas turbine engines for the fan type the bearing support structure carried by the intermediate case, that is the case between a low pressure compressor and a high pressure compressor for supporting a low pressure compressor shaft bearing carry bearings for both low pressure shaft and high pressure shaft.

BACKGROUND ART

In the present construction when the fan engine is subjected to nacelle and thrust induced engine loads large blade clearances in the fan and the low pressure compressor are necessary to avoid contact between the blade tips and the case at high loads. The performance of the engine could be improved by reducing the clearance necessary for the blades of the fan and low pressure compressor. In resolving this bearing support construction there has been the need to consider the power shaft assembly also located at the intermediate compressor case where the #2 bearing is located since any support modification for the bearing cannot interfere with this assembly. Generally, the #2 bearing is supported from the case at a point forward of the power shaft assembly.

DISCLOSURE OF INVENTION

According to the present invention the #2 bearing is supported by a generally conical support extending forwardly from the rearmost portion of the intermediate support structure so that the conical structure extends from a point rearwardly of the power take-off shaft to the bearing structure forwardly of the power shaft. To accommodate the power take-off shaft itself, a reinforced hole is provided in the supporting conical structure and the power shaft support is integrated with the conical structure.

The foregoing and other objects, features and advantages of the present invention will become more apparent in the light of the following detailed description of the preferred embodiments thereof as shown in the accompanying drawing.

BRIEF DESCRIPTION OF THE DRAWINGS

FIG. 1 is a longitudinal sectional view through the intermediate bearing support structure in the power shaft assembly.

FIG. 2 is a similar fragmentary sectional view at a point angularly spaced from the power shaft.

FIG. 3 is a fragmentary sectional view of the conical support along the line 3—3 of FIG. 1 showing the reinforcements of this support.

BEST MODE FOR CARRYING OUT THE INVENTION

The invention is shown in connection with a fan type gas turbine engine in which the low pressure shaft (2), journaled in a bearing (4) carries several low pressure rotor discs and blades and also the fan blades, not shown. The high pressure shaft (6) is supported at its forward end by a bearing (8) and this shaft supports the high pressure discs and blades downstream of the bearing. The end of the high pressure shaft (6) carries a bevel gear (10) cooperating with a mating gear (12) to drive the power shaft (14) extending outwardly from the shaft through a hole (16) in the intermediate case (18). The bearing is generally referred to as the #2 bearing.

The intermediate case is connected at its forward end to an annular cone 20 forming part of the supporting structure for the #1 bearing and at its rearward end attaches with an adjacent casing structure (22). The intermediate case has a plurality of struts (24) extending from the outer wall (not shown) across the gas path to the inner wall 26 of the gas path. These struts engage the inner wall structure (26) of the intermediate case adjacent the rearward end and inwardly of the inner wall structure at this point is a support flange 28 from which the bearings 4 and 8 are both supported.

The flange 28 has an inner integral ring (30) and within this ring is supported a bearing damper structure (31) which is a conventional structure and will not be described in detail except to note that a part of the damper is an annulus (32) in radial alignment with the flange (28) and this annulus supports the outer race (34) for the bearing (8). The inner race (36) is mounted on the shaft (6). The gear 10 is directly forward of the inner race 36 on the shaft 6.

Attached to the supporting ring 30 is a forwardly extending cone 38 (see also FIG. 2) to the forward end of which is attached the outer race (40) for the bearing (4). The inner race (42) is suitably mounted on the shaft (2). In the arrangement shown bearing (8) is a thrust bearing to locate the shaft (6) axially and transversely, and the bearing (4) is a roller bearing to locate the rotor transversely. The effect is that only radial loads are transmitted into the support cone 38.

This support is generally effectively conical as shown in FIG. 2 having mounting flanges (46) and (48) at opposite ends. At the point where the power shaft structure passes through the cone the latter has a bulge 50 with which the supporting cylinder 52 for the bearings (54) and (56) of the power shaft structure is integral. The cylinder 52 extends generally perpendicular to the shaft axis, although the cylinder shown is not precisely at this angle. The arrangement of the bulge (50) is to support the cylinder in a plane at substantial right angle to the axis of the cylinder and to provide a space for the gear (12). The bearing supports the integral sleeve (58) on the bevel gear (12) and the shaft (14) fits within a splined sleeve 60 for driving the sleeve from the gear. The particular drive mechanism is not essential. The arrangement is such as to permit a misalignment between the shaft (14) and the sleeve (58) that is to say the cylinder 52.

The portion of the cone 38 where the bulge 50 engages the case is reinforced since the integrity of the cone is diminished at this point. To accomplish this as shown in FIG. 3 the bulge and the cylinder have reinforcing ribs (62) extending from the bulge to the surface of the cone to minimize any concentration of stress or increased flexibility in the part.

It should be understood that the invention is not limited to the particular embodiments shown and described herein, but that various changes and modifications may be made without departing from the spirit and scope of this novel concept as defined by the following claims.

I claim:

1. A bearing support structure for a low pressure shaft for a fan engine including:
   an intermediate case having an inner wall structure with a support flange extencing inwardly therefrom near the rearward end and support struts extending outwardly from the wall structure in the same transverse plane as the support flange, a support cone attached to said flange and extending forwardly therefrom, a low pressure shaft supported within the cone, said cone having an axis coinciding with the axis of the shift, a bearing supported at the forward end of the cone for the low pressure shaft, a cylinder mounted in said cone between its ends and extending outwardly therefrom, bearings in said cylinder and a power drive shaft supported in said bearings.

2. A bearing support structure as in claim 1 in which the cone has a bulge therein where the cylinder is located to provide a support for the cylinder substantially perpendicular to the cone axis.

3. A bearing support structure as in claim 1 in which there is a high pressure shaft surrounding the low pressure shaft and the support flange also supports a bearing substantially in the transverse plane thereof for the high pressure shaft.

4. A bearing support structure as in claim 1 in which the power drive shaft has a bevel gear on its inner end by which the shaft is driven, and the high pressure shaft carries a meshing gear and the cone has a buldge therein to support the cylinder.

5. A structure as in claim 4 in which the bulge provides a space for the bevel gear.

6. A bearing support structure for a low pressure shaft of a fan engine including:

an intermediate case having an inner wall structure with a support flange extending inwardly therefrom near the rearward end and support struts extending outwardly from the wall structure in same transverse plane as the support flanges, a high pressure shaft supported in the case, a low pressure shaft within the high pressure shaft and having an end extending beyond the high pressure shaft, a bearing supported radially inwardly of said support flange and substantially in the same plane as said flange for the high pressure shaft, a support cone attached to said flange and extending forward and having a buldge thereon between its ends, therefrom, a bearing supported at the forward end of the cone for the low pressure shaft, a cylinder mounted in the buldge on said cone between its ends and extending outwardly therefrom substantially at right angles to the shafts, bearings in said cylinder and a power drive shaft supported in said bearings.

7. A bearing support structure as in claim 6 in which the first bearing in the plane of the support flange supports the high pressure shaft carrying a bevel gear thereon and the power drive shaft has a bevel gear on its inner end meshing with the bevel gear on the high pressure shaft, a bulge being arranged to provide a space within the cones for the bevel gear on the power drive shaft.

8. A structure as in claim 6 in which the cone has a the bulge thereon for supporting the cylinder, the power drive shaft has a bevel gear on its inner end and the bulge provides a space for the bevel gear.

* * * * *

UNITED STATES PATENT AND TRADEMARK OFFICE
CERTIFICATE OF CORRECTION

PATENT NO.  : 4,598,600

DATED       : July 8, 1986

INVENTOR(S) : WILLIAM C. KNOWLES

It is certified that error appears in the above-identified patent and that said Letters Patent is hereby corrected as shown below:

Column 2, line 67, change "extencing" to -- extending --

Column 3, line 6, change "shift" to -- shaft --

Column 4, line 11, after "forward" insert -- therefrom, --

Column 4, line 12, after "ends", delete "therefrom,"

Column 4, line 29, after "has" delete "a"

Signed and Sealed this

Third Day of February, 1987

Attest:

DONALD J. QUIGG

*Attesting Officer*  *Commissioner of Patents and Trademarks*